United States Patent [19]
Sharman

[11] Patent Number: 5,909,292
[45] Date of Patent: Jun. 1, 1999

[54] SCANNING OF IMAGES

[75] Inventor: Richard A. Sharman, Dunstable, United Kingdom

[73] Assignee: Eastman Kodak Company, Rochester, N.Y.

[21] Appl. No.: 08/824,855

[22] Filed: Mar. 26, 1997

[30]     Foreign Application Priority Data

Apr. 2, 1996 [GB] United Kingdom .................... 9606984

[51] Int. Cl.⁶ ...................................................... H04N 1/27
[52] U.S. Cl. ............................................ 358/527; 358/509
[58] Field of Search ..................................... 358/527, 509

[56]            References Cited

U.S. PATENT DOCUMENTS 4,777,102  10/1988  Levine ....................................... 430/21

FOREIGN PATENT DOCUMENTS

| 0 176 358 | 4/1986 | European Pat. Off. . |
| 0 580 293 | 1/1994 | European Pat. Off. . |
| 0 625 555 | 4/1994 | European Pat. Off. . |
| 0 610 994 | 8/1994 | European Pat. Off. . |

*Primary Examiner*—Phuoc Tran
*Attorney, Agent, or Firm*—Frank Pincelli

[57]            ABSTRACT

Described herein is a method of scanning an image by dividing the excitation and emission spectra requirements of a film (10) containing emissive interlayers (15, 16). The film (10) comprises a film base (11) on which three black-and-white records (12, 13, 14) are formed, each record being sensitive to a different color. The black-and-white records (12, 13, 14) are separated from one another by the emissive interlayers (15, 16). The emission of the interlayers and the film transmission are measured using conventional scanner color analysis.

15 Claims, 6 Drawing Sheets

SCANNING OF IMAGES

FIELD OF THE INVENTION

The present invention relates to the scanning of images and is more particularly concerned with the scanning of photographic images.

BACKGROUND OF THE INVENTION

U.S. Pat. No. 4,543,308 describes the measurement of luminescence intensities in exposed and processed photographic film by means of a commercial emission spectrometer, utilizing monochromators on both the illumination and detection sides of the instrument.

EP-A-0 610 994, incorporated herein by reference, describes a color photographic system which uses a color photographic system in which fluorescent interlayers are positioned between red-, green- and blue-sensitive recording layer units (without any dye image-forming materials) which form silver images of substantially the same hue. The color records are read out by scanning both the fluorescent and transmission records. The image densities are read from the two fluorescent interlayers by scanning through red and green filters, and the transmission density being scanned separately.

It is well understood that fluorescent or luminescent layers need to be excited at a particular wavelength to stimulate the production of radiation at another wavelength. A scanning process using a densitometer, with an absorption filter placed in the illuminating light path for fluorescent readout, is disclosed therein.

PROBLEM TO BE SOLVED BY THE INVENTION

In the method described in EP-A-0 610 994, the records need to be scanned separately which is time consuming. Moreover, the three image records obtained need to be aligned to provide the required information.

SUMMARY OF THE INVENTION

It is therefore an object of the present invention to be able to scan all records simultaneously to provide a faster scanning system.

It is a further object of the present invention to provide easier alignment of the three image records.

In accordance with one aspect of the present invention, there is provided a method of scanning an image formed on a photographic film material using a color scanning device having red, green and blue sensitivity bands, the film material comprising red-, green- and blue-sensitive silver halide emulsion layers with a first interlayer located between the blue- and green-sensitive emulsion layers and a second emissive interlayer located between the green- and red-sensitive emulsion layers, characterized in that the method comprises the steps of:

simultaneously illuminating the film material with excitation light for the first and second interlayers, and transmission light;
  simultaneously scanning the illuminated film material to obtain three records of the image formed thereon; and
  determining red, green and blue density values for each image area from the three records, each record comprising density values for at least one emulsion layer, and in that the first interlayer of the film material emits radiation in the blue sensitivity band of the scanning device.

Advantageously, at least the first interlayer comprises a fluorescer, but it is preferred that both the first and the second interlayers comprise fluorescers.

In a preferred embodiment of the invention, the second interlayer of the film material has an emission band in the red sensitivity band of the scanning device. In this case, the transmission band of the light being transmitted through the film material is in the green sensitivity band of the scanning device.

In another embodiment of the invention, the second interlayer may have an emission band in the green sensitivity band of the scanning device and the transmission band is in the red sensitivity band of the scanning device.

ADVANTAGEOUS EFFECT OF THE INVENTION

In accordance with the present invention, high speed simultaneous scanning is provided which is compatible with current scanners having normal red, green and blue responses.

In particular, the invention provides a method of simultaneously scanning all three records, wherein the first fluorescing layer emits radiation within the blue sensitivity band of the scanner, the second fluorescing layer emits radiation within either the red or the green sensitivity band of the scanner, and the transmission density is scanned within the remaining band.

Moreover, in the preferred embodiment of the method of the present invention, accurate reading of the three records is easily provided due to the spectral separation thereof. It is desirable that there is no significant overlap between the absorption and emission spectra for each of the bands used for reading the records.

BRIEF DESCRIPTION OF THE DRAWINGS

For a better understanding of the present invention, reference will now be made, by way of example only, to the accompanying drawings in which.

DETAILED DESCRIPTION OF THE INVENTION

The invention relates to the optoelectronic scanning of photographic images recorded on film material containing a fluorescent or luminescent light-emitting species. The present invention is described below with reference to a film material having fluorescing interlayers.

FLUORESCING INTERLAYER FILM

Figure 1:
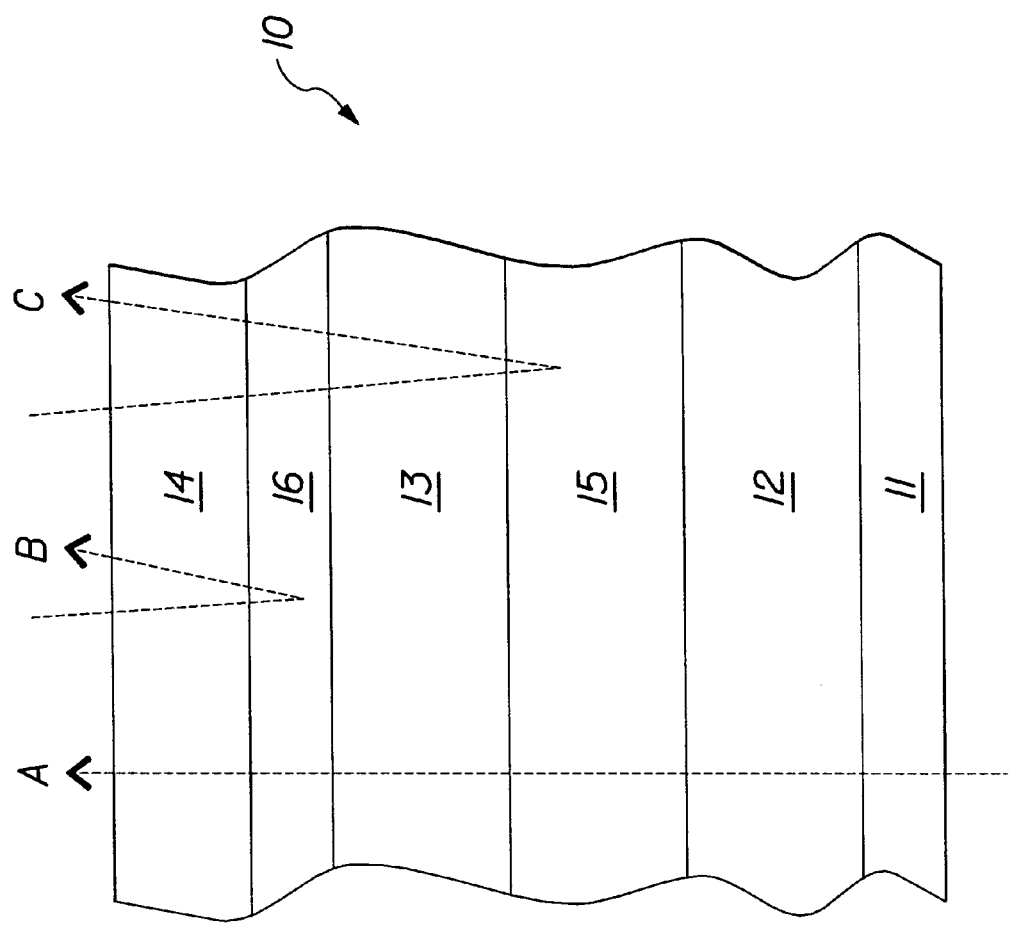
FIG. 1 is a sketch of a simplified fluorescer film structure.

A simplified arrangement of a fluorescer film 10, as described in EP-A-0 610 994, is shown in FIG. 1. The film 10 comprises a film base 11, three black-and-white (b & w) records 12, 13, 14, each sensitized to a different color, and two fluorescing interlayers (or fluorescers) 15, 16. Records 12, 13 and 14 are respectively sensitized to red, green and blue light. The fluorescers 15, 16 enable decoding of the densities in each of the b & w records 12, 13, 14 when the film 10 is scanned.

The film 10 is read by making three measurements using a single scanner, as indicated by dotted lines A, B and C. Along dotted line A, the sum of all three records is measured from the light passing through the entire film, that is, by transmission. Along dotted line B, the first fluorescer 16 is excited and the blue sensitized record 14 is read by reflection. Along dotted line C, the second fluorescer 15 is excited and the sum of the green and blue sensitized records is read by reflection.

It will be appreciated that the film 10 can be read from either side or from both sides. However, in relation to the positioning of a scanner (not shown), it is desirable to restrict the measurements to only one side of the film 10 as illustrated in FIG. 1.

An illumination arrangement used to reject scattered excitation light from the scanner is described in copending U.S. patent application Ser. No. 08/826,058, entitled ILLUMINATION FOR SCANNERS (Attorney Docket 72713), filed concurrently herewith and incorporated herein by reference.

When the film is scanned, the following three measurements are obtained:

$$A: Rd+Gd+Bd \text{ (transmission)} \qquad (1)$$

$$B: 2 \times Bd \text{ (fluorescer 1)} \qquad (2)$$

$$C: (2 \times Bd)+(2 \times Gd) \text{ (fluorescer 2)} \qquad (3)$$

where Rd, Gd and Bd are the densities of the red-, green- and blue-sensitized layers, respectively.

Equations (2) and (3) measure the density twice, once by the excitation light passing through the silver layer to the fluorescer, and once by the emitted light returning back through the silver layer.

Using the above measurements the separation densities can be obtained by a simple subtraction and scaling process using equations (1), (2) and (3) above:

$$Rd = (1) - (\tfrac{1}{2} \times (3))$$

$$Gd = \tfrac{1}{2} \times ((3) - (2))$$

$$Bd = \tfrac{1}{2} \times (2)$$

FILM SCANNING

The two main modes of scanning the film are either sequential, where each separation is measured in turn, or simultaneous where all three separations are measured together. In sequential mode, the scanner reads and stores each of the separation data in turn, with an appropriate color filter in place. In simultaneous mode, the scanner uses color separation filters to direct the light to separate sensors or pixels.

For the highest speed, simultaneous operation of the scanner should be used, this is particularly true for a linear scanner. For an area scanner, or where time is less of a constraint, then the penalty of sequential scanning may be offset by simpler scanner design.

For a sequential system, the fluorescers in an interlayer film are required to emit radiation only at different wavelengths. The scanner filtration then provides the discrimination between the separations. Moreover, the wavelength of light used to read the transmission density could be the same as either the excitation or the emission wavelengths of the fluorescers.

For simultaneous reading of the three film layers, the light has to be split into discrete bands, three bands for reading and two for excitation, although the excitation band for the two fluorescers could be the same. The reading band separation has to provide adequate isolation between the two fluorescer emissions and the transmission light. A film designed for simultaneous reading could also be read sequentially, but the reverse may not be necessarily true.

SPECTRAL ANALYSIS

Figure 2:
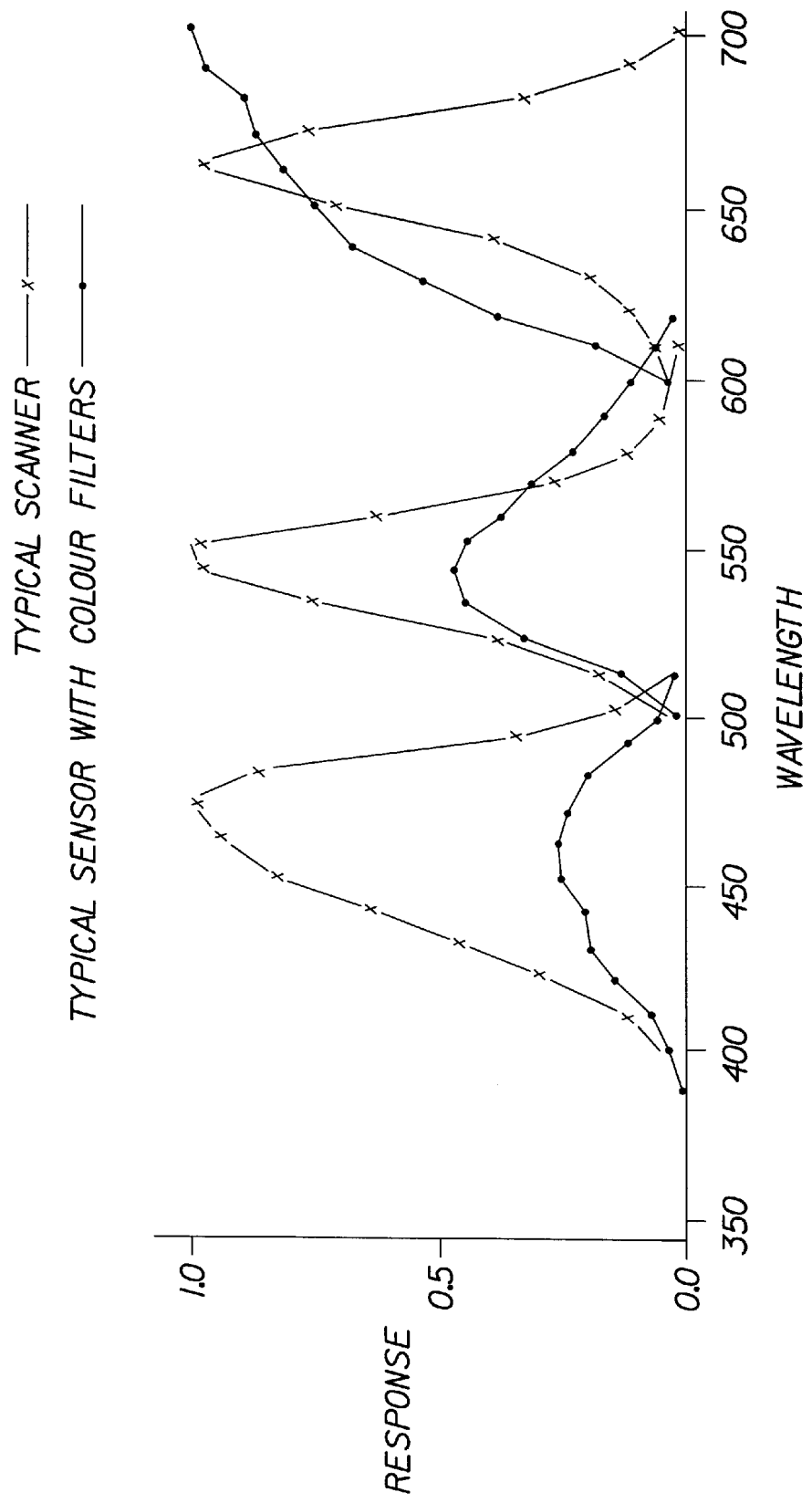
FIG. 2 is a graph illustrating the spectral response for a typical scanner and sensor arrangement.

The spectral analysis for a conventional scanner has sensitivities in the blue, green and red, as shown in FIG. 2. For a scanner for film with fluorescers, additional spectral regions have to be accommodated, that is, the excitation band(s) for the two fluorescers.

The spectral bandwidth available is limited by the sensor in the scanner for the reading bands and the illumination source for the excitation bands. A typical charge-coupled device (CCD) sensor covers a bandwidth from 400 nm to about 700 nm, and a tungsten halogen lamp used for illuminating the film emits radiation at a wavelength from 350 nm to over 900 nm. The half sensitivity points of a typical color scanner with such a sensor give a blue band from 420 nm to 490 nm, a green band from 520 nm to 580 nm, and a red band from 630 nm to beyond 700 nm.

In order to meet the requirements for compatibility, the three reading bands of the film 10 should fall within the bandwidths shown in FIG. 2.

The absorption spectra of fluorescers 15, 16, although well defined on the long wavelength side, are not so well defined on the short wavelength side and tend absorb in varying amounts into the ultraviolet (UV) region.

It is this tendency of the fluorescers to absorb in the blue that precludes the use of the blue band for the transmission reading. The blue transmission light could excite the fluorescers 15, 16 and degrade the data received therefrom.

In addition, various developer agents tend to leave yellow stains that would degrade the blue transmission measurement. These factors dictate that the first fluorescer 16 has to emit at a wavelength within the blue band shown in FIG. 2. The second fluorescer 15 has several possibilities and could emit in either the green or the red band with the transmission channel using the remaining band.

FIRST FLUORESCER

Figure 3:
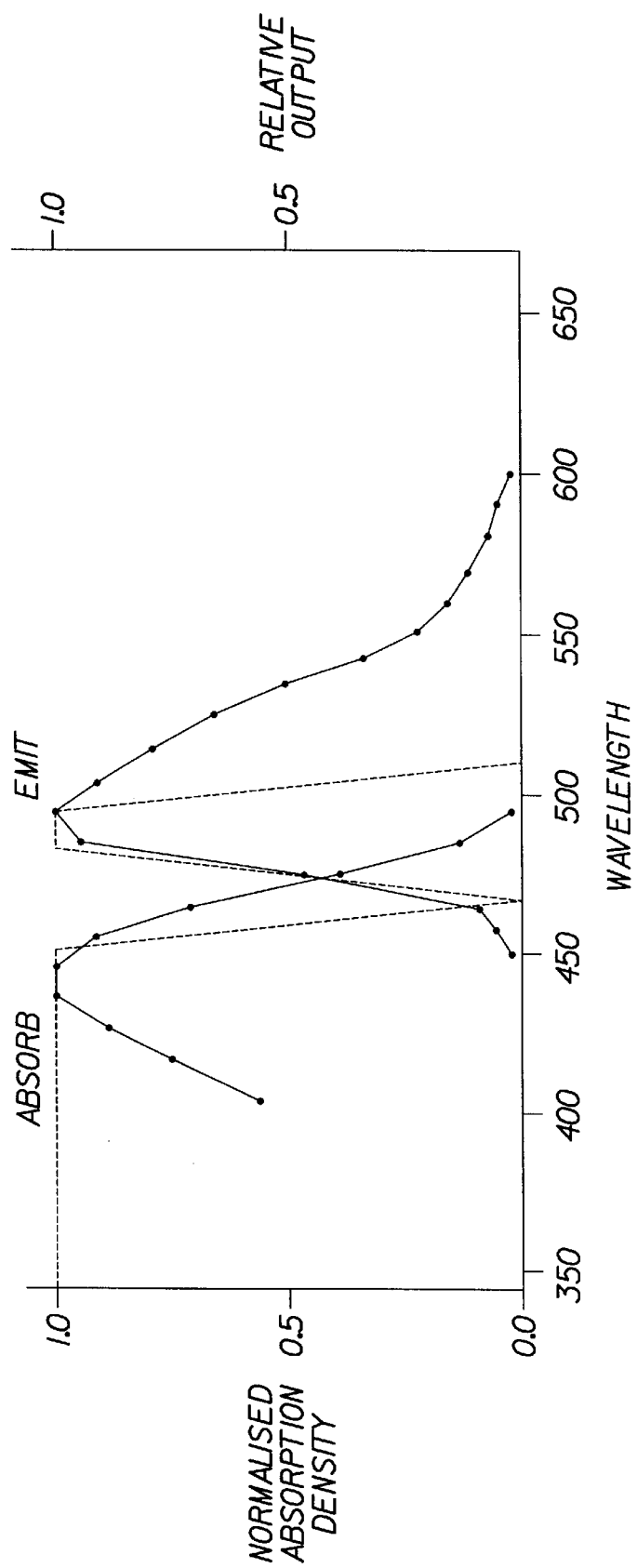
FIG. 3 is a graph illustrating blue/green fluorescer absorption and emission.

In relation to the first fluorescer 16, a number of variations of Coumarin (blue/green) dyes show peak emissions at wavelengths of 480 nm to 490 nm which would fit into the blue band shown in FIG. 2. FIG. 3 shows an example of absorption and emission characteristics for one such the blue/green fluorescer.

The main consideration of the first fluorescer, in a simultaneous reading system, is that the emitted light has dropped to an insignificant level before the next reading band. Using this fluorescer as an example, the excitation band might be up to a wavelength of 450 nm and the emission band between 470 nm and 500 nm.

SECOND FLUORESCER

There are several possibilities for the spectra for the second fluorescer. The emission band may:

(i) emit in the green; or
(ii) emit in the red

The excitation band may:

(a) be the same as for the first fluorescer; or
(b) excite between the blue and green reading bands.

Green Emission

If the second fluorescer 15 were to emit in the green sensitive band of the scanner the excitation light could be the same as for the first fluorescer 16. Alternatively, the emission band of the second fluorescer could be contained within the band 500 nm to 580 nm.

A suitable Coumarin fluorescer can be obtained with a peak absorbence at 421 nm and a peak emission at 538 nm. This fluorescer would meet the spectral requirements for a green fluorescer with the same excitation band as the blue fluorescer, but although the excitation light has to be shared the main problem with this approach is the separation of the two emissions. The emission tail of the blue fluorescer would prevent adequate separation of the green and blue readings.

Figure 4:
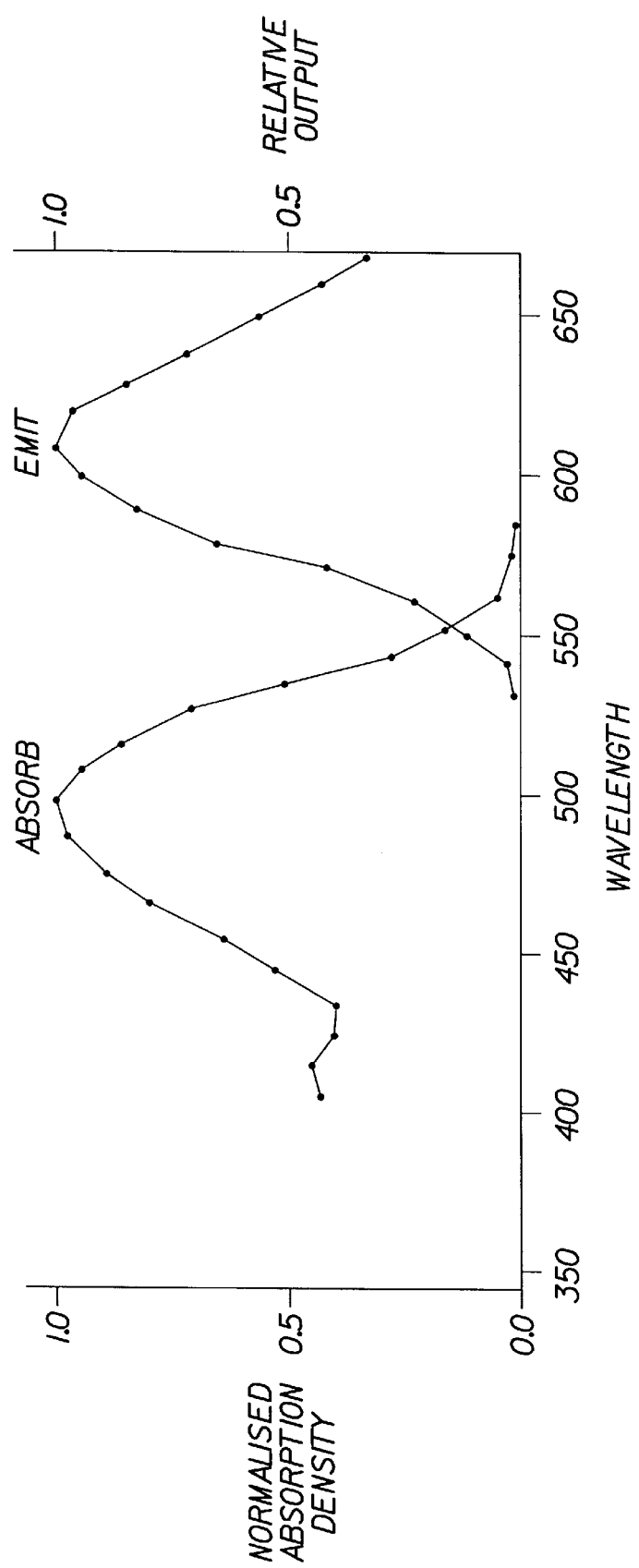
FIG. 4 is a graph illustrating green/yellow fluorescer absorption and emission.

In order to improve the separation of the emissions the excitation band has to be moved beyond the blue reading band. FIG. 4 shows the spectrum of a typical green/yellow emitting fluorescer with an emission band just inside the green sensitivity curve and an absorption peak just outside the blue reading band.

The emission peak at the upper wavelength side of the green reading band now provides the required separation from the blue fluorescer emission, although the excitation light would have to be restricted to a band of 510 nm to 550 nm, which is not the most efficient for the fluorescer. The emission tail of this fluorescer dictates that the red band for the transmission reading would need to be beyond 680 nm.

Red Emission

Figure 5:
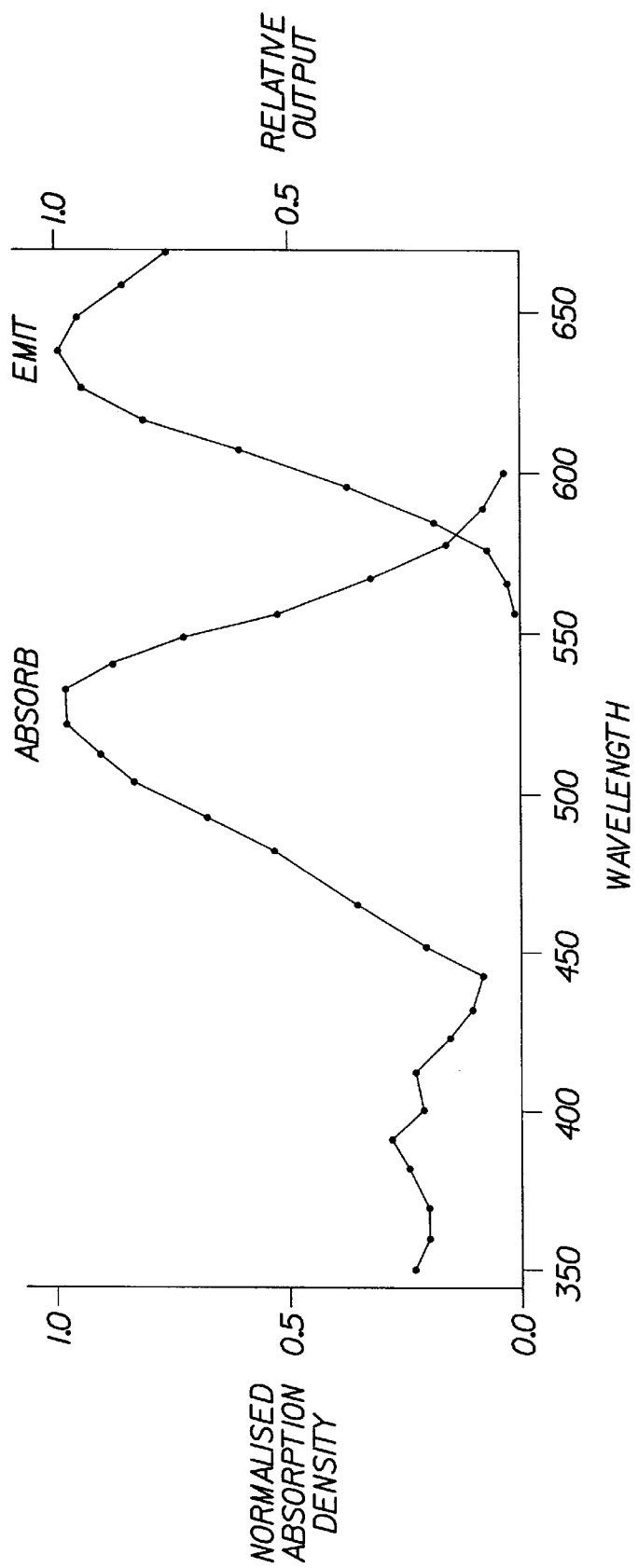
FIG. 5 is a graph illustrating a green-absorbing/red-emitting fluorescer absorption and emission.

As shown in FIG. 4, there is a significant gap between the emission and absorption spectra of the fluorescer. This gap occurs near the peak transmission of the green sensitivity and could be used for the transmission reading. The second fluorescer would then need to absorb in the green and emit in the red. FIG. 5 shows the spectral characteristic of the DCM class of fluorescers comprising green/red dyes, with a peak absorbence at 527 nm and a peak emission at 641 nm. Here the gap between the fluorescence and absorption would allow a transmission reading in the green.

In determining the position of the transmission band, care has to be taken that it is clear of the emission from both the fluorescers but within the green band shown in FIG. 2. There is little problem with the light level in transmission, and use can be made of this to reduce the bandwidth and ease the positioning problem of the transmission band. If the transmission bandwidth is reduced to 10 nm, then the combination of bandwidth and light level will provide minimal impact on the excitation of the red fluorescer, and still be clear of its emission.

Using a fluorescer having spectral characteristics as shown in FIG. 5, a transmission band from 520 nm to 580 nm with a peak of 570 nm will allow the excitation bandwidth to be from 510 nm to 550 nm and theemission band to be from 630 nm to 700 nm with a peak emission at 640 nm, which would fit into the red band shown in FIG. 2.

Figure 6:
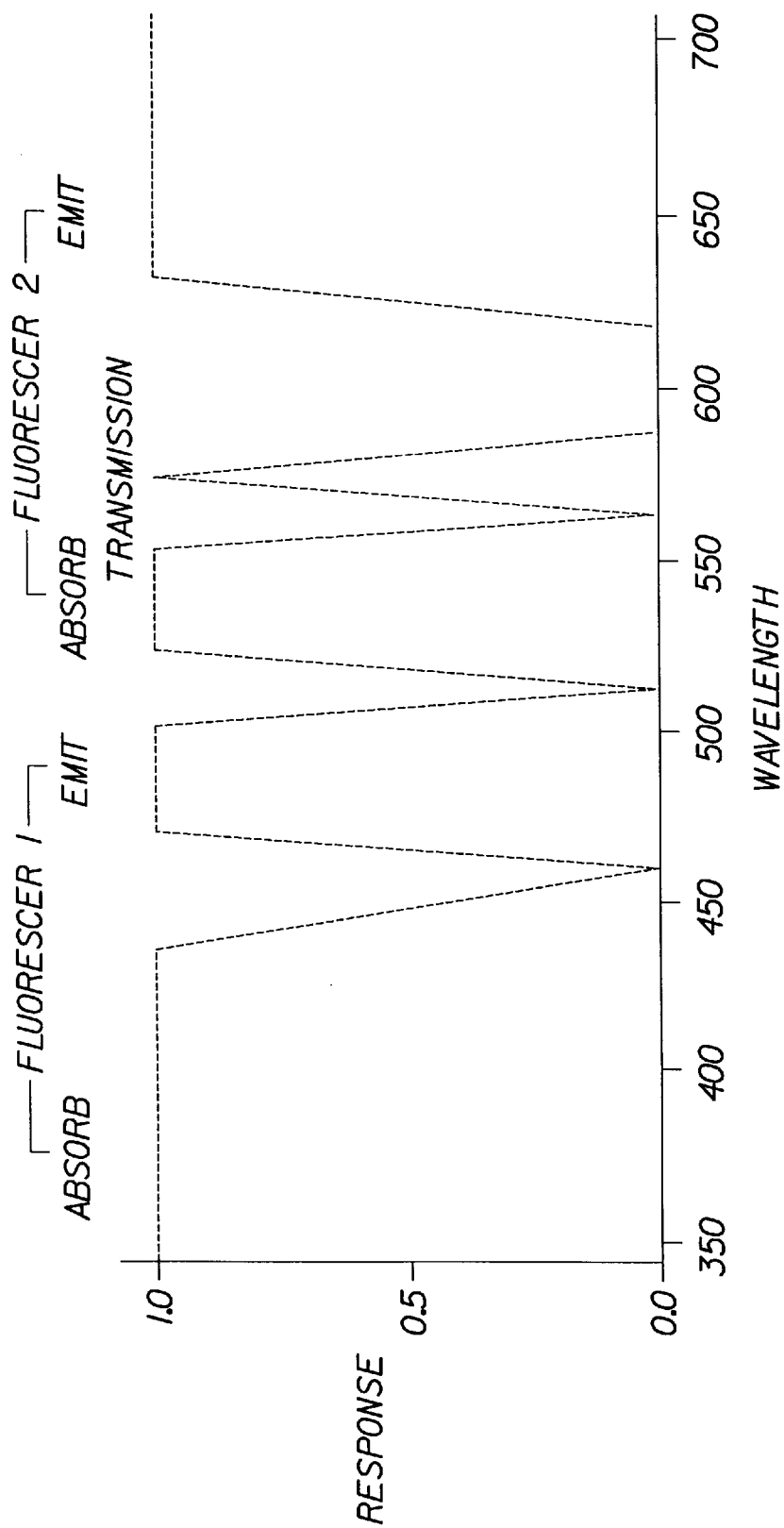
FIG. 6 is a graph illustrating the distribution of the spectrum for a system in accordance with the present invention.

Using the blue-emitting and green-emitting fluorescers with separate excitation, and the red band for reading the film transmission, a compatible film/scanner system can be designed. But by using a green-absorbing, red-emitting fluorescer for the second fluorescer, a better match between the fluorescer absorbence and the available spectrum can be made. This will result in more efficient use of the excitation light and ease the spectral requirements of the second fluorescer. FIG. 6 shows the distribution of the spectrum for a compatible system.

An arrangement of dichroic filters to realize the required division of the spectrum for a compatible film system is described in copending U.S. patent application Ser. No. 08/826,058, entitled ILLUMINATION FOR SCANNERS (Attorney Docket 72713), as described above.

It is to be understood that various other changes and modifications may be made without departing from the scope of the present invention. The present invention being defined by the following claim.

| Parts List | |
|---|---|
| 10 | film |
| 11 | film base |
| 12, 13, 14 | b&w records |
| 15, 16 | flourescers |
| A, B, C | measurements |

I claim:

1. A method of scanning an image formed on a photographic film material using a color scanning device having red, green and blue sensitivity bands, the film material comprising three black and white records, each record being sensitized to a different spectral region of red, green or blue light with a first interlayer located between the blue- and green-sensitive layers and a second emissive interlayer located between the green- and red-sensitive layers, characterized in that the method comprises the steps of:

simultaneously illuminating the film material with excitation light for the first and second interlayers, and transmission light;

simultaneously scanning the illuminated film material to obtain three records of the image formed thereon; and determining red, green and blue density values for each image area from the three records, each record comprising density values for at least one layer, and in that the first interlayer of the film material emits radiation in the blue sensitivity band of the scanning device.

2. A method according to claim 1, wherein at least the first interlayer comprises a fluorescer.

3. A method according to claim 2, wherein both the first and the second interlayers comprise fluorescers.

4. A method according to claim 3, wherein the second interlayer of the film material has an emission band in the red sensitivity band of the scanning device.

5. A method according to claim 4, wherein the transmission band of the light being transmitted through the film material is in the green sensitivity band of the scanning device.

6. A method according to claim 2, wherein the first interlayer has an emission band of 470 nm to 500 nm, the excitation band being less than 450 nm.

7. A method according to claim 6, wherein the emission band of the first interlayer is 480 nm to 490 nm.

8. A method according to claim 3, wherein the second interlayer has an emission band of 630 nm to 700 nm, the excitation band being 510 nm to 550 nm.

9. A method according to claim 8, wherein the emission band of the second interlayer is substantially 640 nm.

10. A method according to claim 8, wherein the transmission band is 520 nm to 580 nm.

11. A method according to claim 10, wherein the transmission band is substantially 570 nm.

12. A method according to claim 3, wherein the second interlayer of the film material has an emission band in the green sensitivity band of the scanning device.

13. A method according to claim 12, wherein the transmission band of the light being transmitted through the film material is in the red sensitivity band of the scanning device.

14. A method according to claim 12, wherein the emission band of the second interlayer is 500 nm to 580 nm.

15. A method according to claim 1 wherein each record is a silver halide emulsion layer.

* * * * *